United States Patent
Lee et al.

(10) Patent No.: US 12,079,361 B2
(45) Date of Patent: Sep. 3, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Dongik Lee, Suwon-si (KR); Eungjun Kim, Suwon-si (KR); Jihoon Park, Suwon-si (KR); Junbum Shin, Suwon-si (KR); Chungyong Eom, Suwon-si (KR); Youngman Jung, Suwon-si (KR); Jongmin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 233 days.

(21) Appl. No.: 17/949,015

(22) Filed: Sep. 20, 2022

(65) Prior Publication Data

US 2023/0016902 A1 Jan. 19, 2023

Related U.S. Application Data

(63) Continuation of application No. PCT/KR2021/009262, filed on Jul. 19, 2021.

(30) Foreign Application Priority Data

Oct. 20, 2020 (KR) ........................ 10-2020-0135759

(51) Int. Cl.
*G06F 21/62* (2013.01)
*G06F 21/31* (2013.01)

(52) U.S. Cl.
CPC .......... *G06F 21/6218* (2013.01); *G06F 21/31* (2013.01); *G06F 2221/2141* (2013.01)

(58) Field of Classification Search
CPC ................. G06F 21/6218; G06F 21/31; G06F 2221/2141; G06F 21/62; G06Q 50/00; G06Q 50/10; H04L 67/61
See application file for complete search history.

(56) References Cited

U.S. PATENT DOCUMENTS 7,464,400 B2 * 12/2008 Jindani ................. H04L 63/102
380/231
8,909,926 B2 12/2014 Brandt et al.
(Continued)

FOREIGN PATENT DOCUMENTS

| EP | 3040899 A1 * | 7/2016 | ........... G06F 21/604 |
| EP | 3200161 A1 * | 8/2017 | ......... G06F 16/9535 |

(Continued)

OTHER PUBLICATIONS

International Search Report for PCT/KR2021/009262 dated Oct. 21, 2021, 6 pages (with English Translation).
(Continued)

*Primary Examiner* — Sargon N Nano
(74) *Attorney, Agent, or Firm* — Nixon & Vanderhye, P.C.

(57) ABSTRACT

An electronic apparatus is provided. The electronic apparatus according to the disclosure includes: a display, a communication interface comprising communication circuitry, a memory, and a processor. The processor may be configured to: based on acquiring a user command for executing an application stored in the memory, execute the application, based on acquiring a request for access for information stored in the memory through the communication interface while executing the application, acquire access control information of another electronic apparatus related to the electronic apparatus for the application and a relevance between the user and the user of the another electronic apparatus, acquire guide information for guiding a response
(Continued)

to the request for access based on the access control information and the relevance, and control the display to display a message including the guide information.

13 Claims, 11 Drawing Sheets

(56) References Cited

U.S. PATENT DOCUMENTS

| | | | |
|---|---|---|---|
| 9,712,535 | B1 | 7/2017 | Rossman |
| 9,813,522 | B2 | 11/2017 | Van Wie |
| 9,977,911 | B2 | 5/2018 | Mallozzi |
| 10,038,724 | B2 | 7/2018 | Brucker et al. |
| 10,084,793 | B2 | 9/2018 | Lee et al. |
| 10,228,903 | B2 | 3/2019 | Kang et al. |
| 10,257,197 | B2 | 4/2019 | White et al. |
| 10,268,826 | B2 | 4/2019 | Hamilton et al. |
| 10,496,840 | B1 | 12/2019 | Mehr et al. |
| 10,673,979 | B2 | 6/2020 | Wang et al. |
| 10,715,529 | B2 | 7/2020 | Szabo et al. |
| 11,914,696 | B1* | 2/2024 | Saxe ............... G06F 9/4843 |
| 2013/0174222 | A1* | 7/2013 | Ogle ............... G06F 21/577 |
| | | | 726/3 |
| 2013/0247223 | A1 | 9/2013 | Park et al. |
| 2014/0059695 | A1* | 2/2014 | Parecki ............ H04W 12/08 |
| | | | 726/26 |
| 2015/0026580 | A1 | 1/2015 | Kang et al. |
| 2015/0222606 | A1* | 8/2015 | Yan ............... H04L 63/0428 |
| | | | 713/171 |
| 2015/0256517 | A1* | 9/2015 | Yan ............... H04L 63/0428 |
| | | | 713/171 |
| 2016/0148011 | A1 | 5/2016 | Lee et al. |
| 2016/0191534 | A1* | 6/2016 | Mallozzi ............ G06F 21/6218 |
| | | | 726/4 |
| 2016/0210467 | A1* | 7/2016 | Mehrab ............ G06F 21/6245 |
| 2018/0278716 | A1 | 9/2018 | Wang et al. |
| 2019/0166400 | A1 | 5/2019 | Andreou et al. |
| 2020/0193054 | A1 | 6/2020 | Bond |

FOREIGN PATENT DOCUMENTS

| | | |
|---|---|---|
| JP | 4871991 | 2/2012 |
| KR | 10-2015-0010517 | 1/2015 |
| KR | 10-2015-0119519 | 10/2015 |
| KR | 10-2016-0063018 | 6/2016 |
| KR | 10-2017-0104145 | 9/2017 |
| KR | 10-2018-0089479 | 8/2018 |
| KR | 10-2146883 | 8/2020 |

OTHER PUBLICATIONS

Written Opinion of the ISA for PCT/KR2021/009262 dated Oct. 21, 2021, 8 pages (with English Translation).

* cited by examiner

FIG. 4

| GROUP | MEMBER | WEIGHT | ACCESS CONTROL INFORMATION (COEFFICIENT) | | ACCESS APPROVAL SCORE (= WEIGHT * COEFFICIENT) |
|---|---|---|---|---|---|
| I | -- | 10 | APPROVAL(1) | = | 10*1=10 |
| FAMILY | -- | 8 | REFUSAL(0) | | 8*0=0 |
| FRIEND | MIN-JUN KIM | 10 | APPROVAL(1) | | 10*1=10 |
| | SEO-YEON KIM | 5 | REFUSAL(0) | | 5*0=0 |
| | | | | | TOTAL SUM=20 |
| | | | | | AVERAGE=20/4=5 |

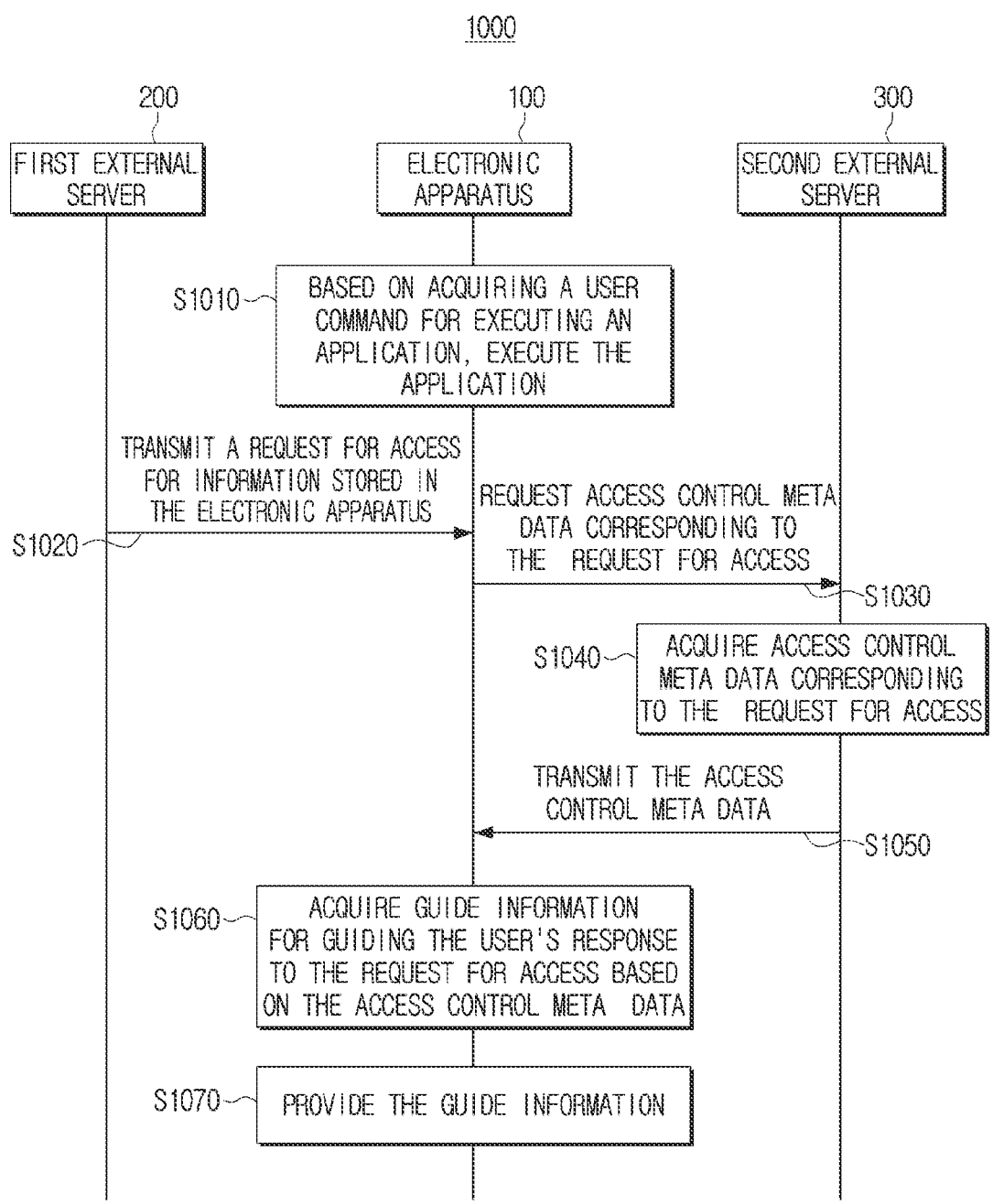

ELECTRONIC APPARATUS AND METHOD FOR CONTROLLING THEREOF

CROSS-REFERENCE TO RELATED APPLICATIONS

This application is a bypass continuation of International Application No. PCT/KR2021/009262 designating the United States, filed on Jul. 19, 2021, in the Korean Intellectual Property Office and claiming priority to Korean Patent Application No. 10-2020-0135759, filed Oct. 20, 2020 in the Korean Intellectual Property Office, the disclosures of which are incorporated by reference herein in their entireties.

BACKGROUND

Field

The disclosure relates to an electronic apparatus and a method for controlling thereof, and for example, to an electronic apparatus that provides guide information for control of access by an external server to the electronic apparatus, and a method for controlling thereof.

Description of Related Art

While an application installed on a user terminal such as a smartphone is being executed, cases wherein the application requests access to information or resources stored in the user terminal frequently occur. For example, there is a case wherein a photo editing application requests access to a photo album stored in a user terminal.

When such a request for access occurs, a user has to directly determine and set whether to approve the request for access to the application, and this is a fairly cumbersome work. Accordingly, some users approve a request for access without prudently thinking about whether to approve the request for access, and in case personal information such as a passport or an image that photographed an identification card is stored in a user terminal, there is a risk that a security accident may occur.

Accordingly, there is a rising need for a technology of providing guide information for guiding such that a user can determine whether to approve a request for access more easily.

SUMMARY

Embodiments of the disclosure provide an electronic apparatus that provides guide information for control of access by an external server to the electronic apparatus, and a method for controlling thereof.

The disclosure is not limited to the features mentioned above, and other features that were not mentioned would be clearly understood by a person having ordinary skill in the art to which the disclosure belongs.

According to an example embodiment of the disclosure an electronic apparatus includes: a display, a communication interface comprising communication circuitry, a memory, and a processor, wherein the processor is configured to: based on acquiring a command for executing an application stored in the memory, execute the application, based on acquiring a request for access for information stored in the memory through the communication interface while executing the application, acquire access control information of another electronic apparatus related to the electronic apparatus for the application and relevance between a user of the electronic apparatus and a user of the another electronic apparatus, acquire guide information for guiding a response to the request for access based on the access control information and the relevance, and control the display to display a message including the guide information.

The access control information may comprise at least one of whether the another electronic apparatus approved the request for access of the application or an approval range, and the processor may be configured to: identify a coefficient corresponding to the access control information and a weight corresponding to the relevance, multiply the coefficient and the weight and calculate an access approval score, and acquire the guide information based on the access approval score.

The processor may be configured to control the electronic apparatus to acquire guide information recommending approval for the request for access, based on the access approval score being greater than a specified value, and acquire guide information recommending refusal for the request for access, based on the access approval score being less than the specified value.

The processor may be configured to control the display to display a UI element corresponding to the access approval score.

The processor may be configured to: acquire the guide information based on relevance between information on the application and the information stored in the memory, and the information on the application may comprise at least one of information on the purpose of the service of the application or information on a use for using the information stored in the memory.

The weight may be set by the user, and the memory may store a lookup table wherein the coefficient and the weight are matched to each other.

The information stored in the memory and the access control information may be acquired from the another electronic apparatus through the communication interface.

According to an example embodiment of the disclosure, a method for controlling an electronic apparatus includes: based on acquiring a command for executing an application stored in the electronic apparatus, executing the application, based on acquiring a request for access for information stored in the electronic apparatus from an external server while executing the application, acquiring access control information of another electronic apparatus related to the electronic apparatus for the application and relevance between a user of the electronic apparatus and a user of the another electronic apparatus, acquiring guide information for guiding a response to the request for access based on the access control information and the relevance, and displaying a message including the guide information.

The access control information may comprise at least one of whether the another electronic apparatus approved the request for access of the application or an approval range, and the acquiring guide information may comprise: identifying a coefficient corresponding to the access control information and a weight corresponding to the relevance, multiplying the coefficient and the weight and calculating an access approval score and acquiring the guide information based on the access approval score.

The acquiring guide information may comprise: acquiring guide information recommending approval for the request for access, based on the access approval score being greater than a specified value and acquiring guide information recommending refusal for the request for access, based on the access approval score being less than the specified value.

The method may further comprise displaying a UI element corresponding to the access approval score.

The acquiring guide information may comprise: acquiring the guide information based on relevance between information on the application and the information stored in the memory, and the information on the application may comprise at least one of information on the purpose of the service of the application or information on a use for using the information stored in the memory.

The weight may be set by the user, and the coefficient and the weight may be matched to each other and stored as a lookup table.

The stored information and the access control information may be acquired from the another electronic apparatus.

The disclosure is not limited to the aforementioned method and apparatus, and various modifications and/or alternatives will be clearly understood by a person having ordinary skill in the art to which the disclosure belongs.

According to the various example embodiments of the disclosure as described above, an electronic apparatus can provide guide information for guiding such that a user can determine whether to approve a request for access more easily. Accordingly, a user's convenience and satisfaction can be improved.

Other than the above, effects that can be obtained or predicted by the embodiments of the disclosure will be directly or implicitly disclosed in the detailed description. For example, various effects according to various example embodiments of the disclosure will be disclosed in the detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Figure 5:
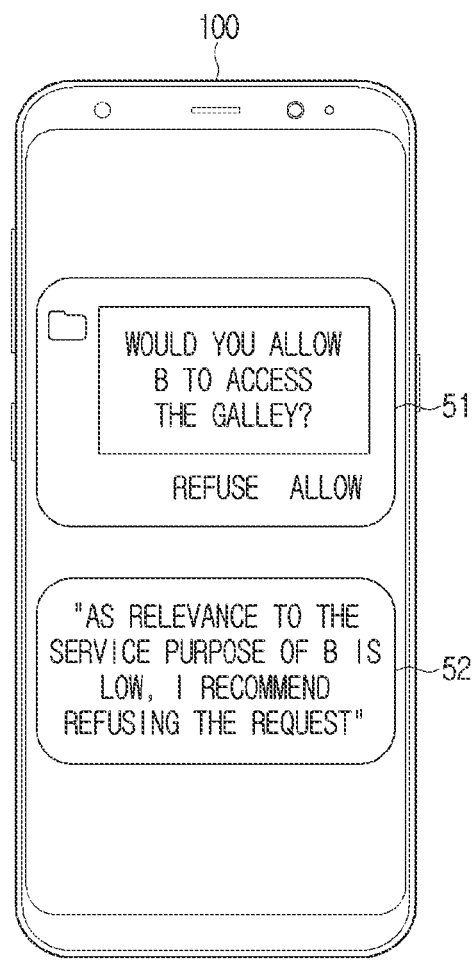
Figure 6:
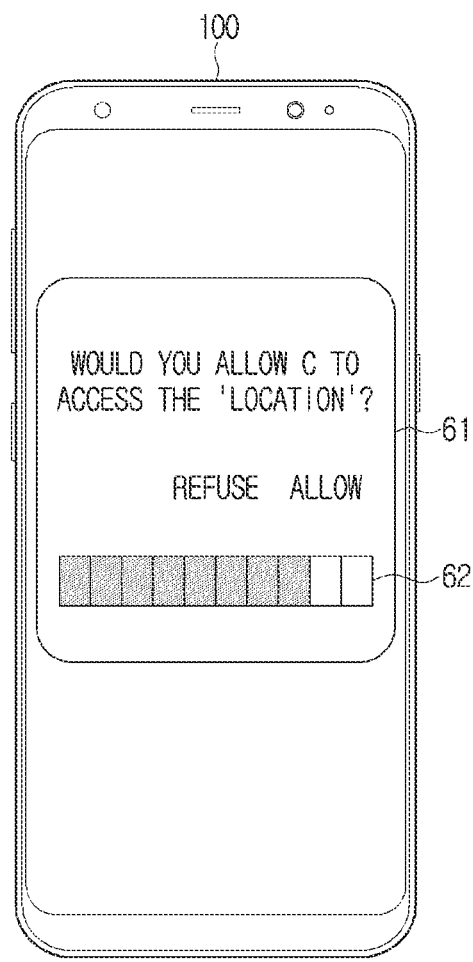
Figure 7:
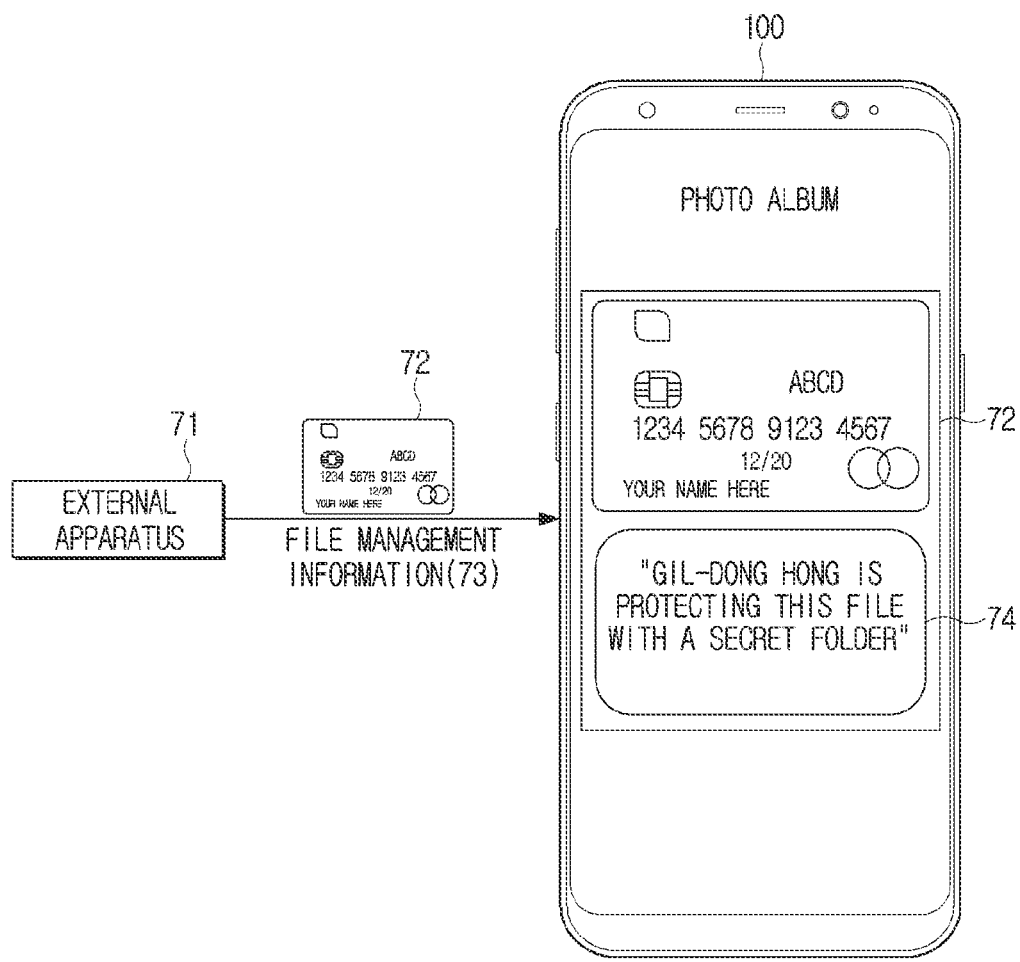
Figure 8:
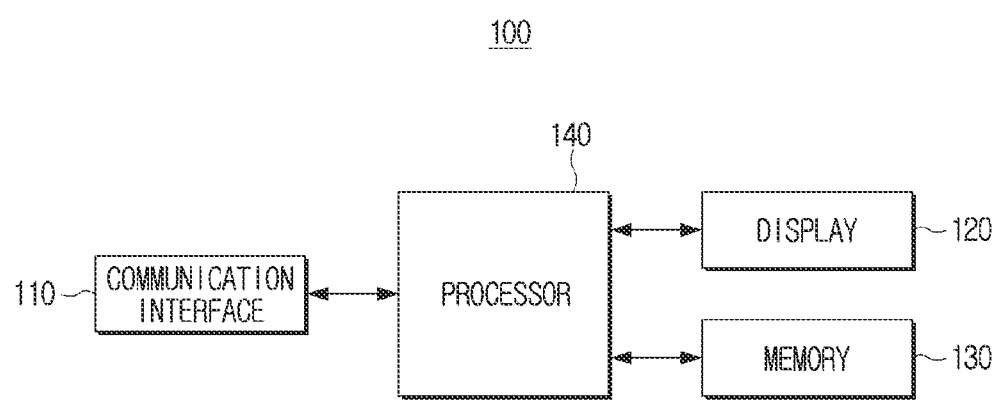
Figure 9:
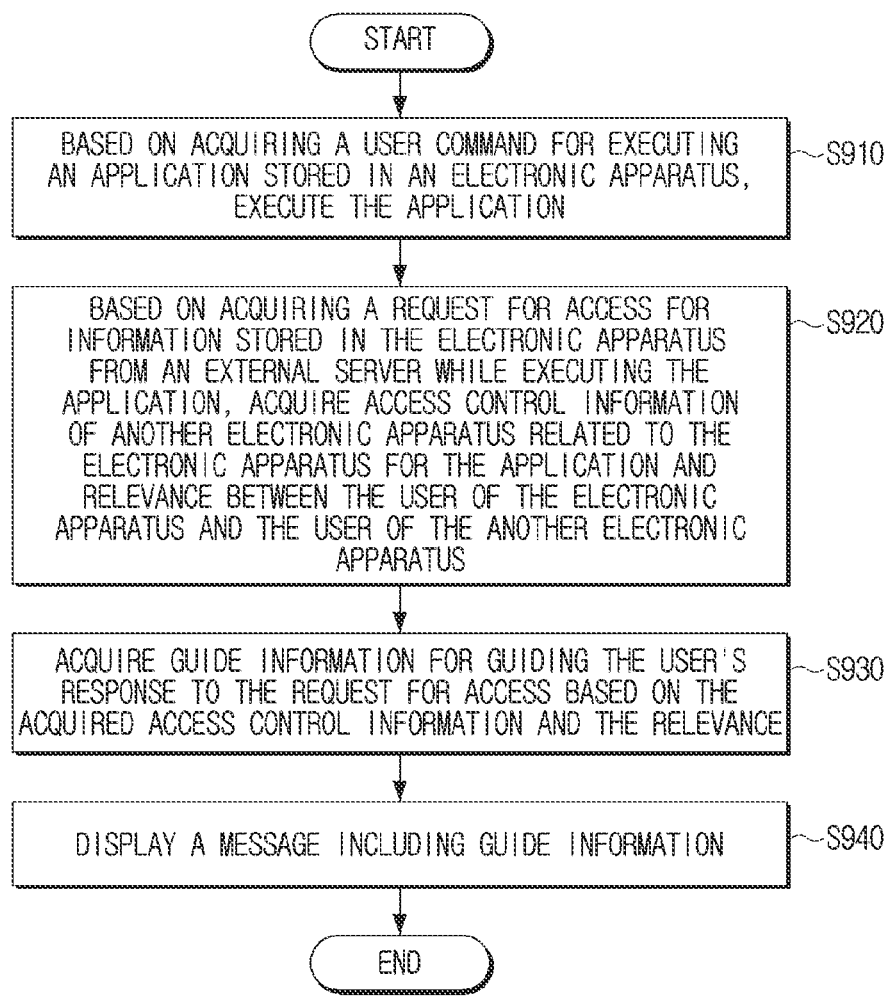

FIB. 3B is a block diagram illustrating an example method for acquiring access control information according to various embodiments;

FIG. 4 is a diagram illustrating an example method for calculating an access approval score according various embodiments;

FIG. 5 is a diagram illustrating an example method for providing guide information according to various embodiments;

FIG. 6 is a diagram illustrating an example method for providing guide information according to various embodiments;

FIG. 7 is a diagram illustrating an example method for providing guide information according to various embodiments;

FIG. 8 is a block diagram illustrating an example configuration of an electronic apparatus according to various embodiments;

FIG. 9 is a flowchart illustrating an example method for controlling an electronic apparatus according to various embodiments; and FIG. 10 is a signal flow diagram illustrating an example access control recommendation system according to various embodiments.

DETAILED DESCRIPTION

Terms used in this disclosure will be described briefly, and the disclosure will be described in greater detail below.

As terms used in the disclosure, general terms that are currently used widely were selected as far as possible, in consideration of the functions described in the disclosure. However, the terms may vary depending on the intention of those skilled in the art, previous court decisions, or emergence of new technologies. Also, in particular cases, there may be terms that are arbitrarily selected, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Various modifications may be made to the various example embodiments of the disclosure, and there may be various types of embodiments. Accordingly, various example embodiments will be illustrated in drawings, and the embodiments will be described in detail in the detailed description. However, it should be noted that the various embodiments are not intended to limit the scope of the disclosure to a specific embodiment, but they should be understood to include all modifications, equivalents, or alternatives included in the ideas and the technical scope disclosed herein. Further, in describing the embodiments, in case it is determined that detailed explanation of related known technologies may confuse or obscure the gist of the disclosure, the detailed explanation may be omitted.

In addition, terms such as 'the first,' 'the second,' and the like may be used to describe various components, but these components are not to be limited by the terms. The terms may be used simply for the purpose of distinguishing one component from another component.

Further, singular expressions include plural expressions, unless defined obviously differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Hereinafter, example embodiments of the disclosure will be described in greater detail with reference to the accompanying drawings. However, it should be noted that the disclosure may be implemented in various different forms, and is not limited to the example embodiments described herein. Also throughout the specification, similar components were designated by similar reference numerals.

Figure 1:
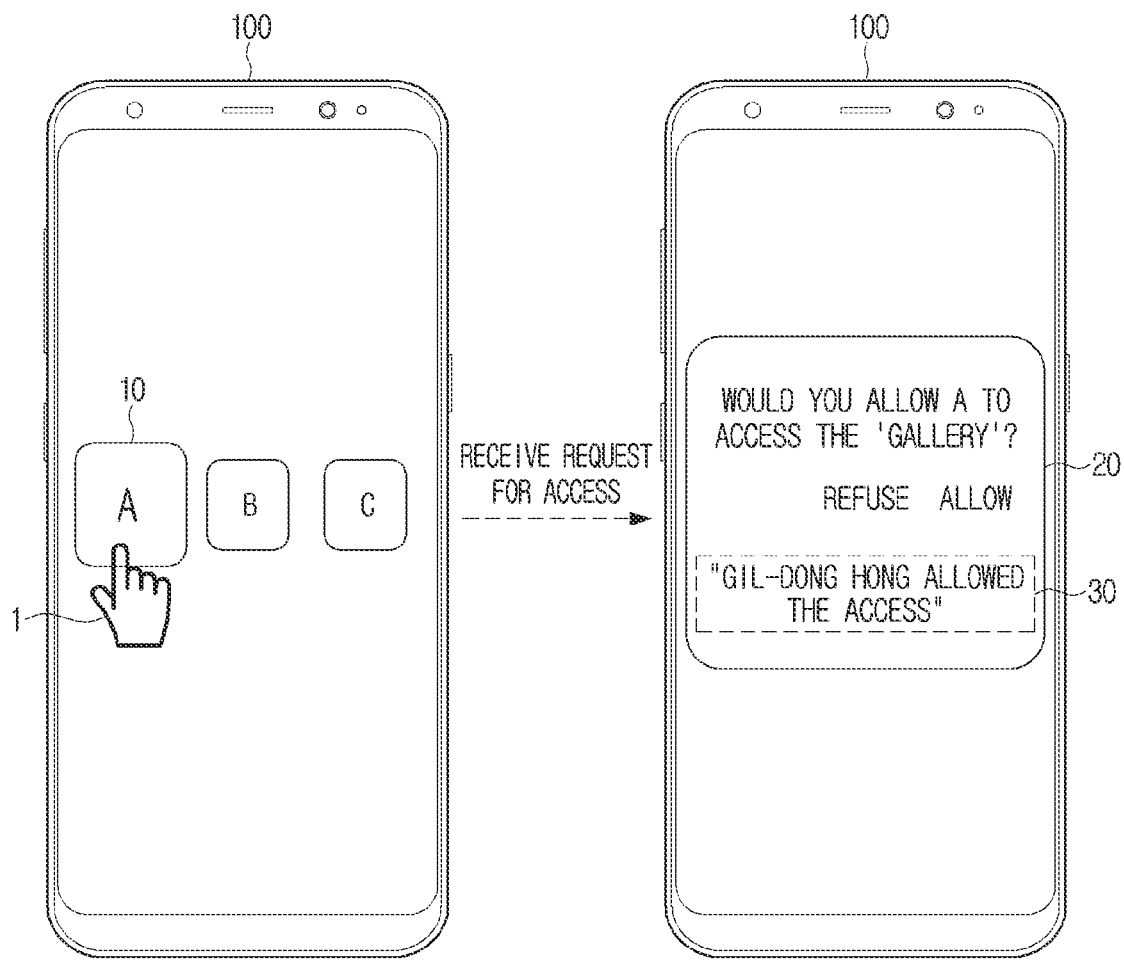
FIG. 1 is a diagram illustrating an example method for providing guide information according to various embodiments.

FIG. 1 is a diagram illustrating an example method for providing guide information according to various embodiments. An electronic apparatus 100 may acquire or receive a command, e.g., a user command, for executing at least one application installed in the electronic apparatus 100. For example, the electronic apparatus 100 may acquire a touch input of a user 1 for executing a first application 10. When a user command as above is acquired, the electronic apparatus 100 may execute the first application 10.

While the first application 10 is executed, the electronic apparatus 100 may acquire a request for access for information stored in the electronic apparatus 100. For example, the electronic apparatus 100 may receive a request for access for a gallery (or a photo album) stored in the electronic apparatus 100 from a first external server corresponding to the first application 10. When a request for access is received, the electronic apparatus 100 may display a message 20 regarding the request for access. For example, the electronic apparatus 100 may display a message inquiring whether to approve the request for access of the first application 10 (Would you allow A to access the 'gallery'?).

The electronic apparatus 100 may display a message 20 including guide information 30, so that the user can determine whether to approve the request for access of the first application 10 more easily. For example, the guide information 30 may include whether a friend (Gil-dong Hong) of the user 1 registered in the address book of the electronic apparatus 100 approved a request for access of the first application 10 and an access approval range. When the guide information 30 is provided by the electronic apparatus 100 as above, the user 1 can determine whether to approve the request for access of the first application 10 more easily. For example, if the user 1 and the user of another electronic apparatus included in the guide information 30 are in a close relationship, the user 1 may set access control for the first application 10 in a similar manner to the access control information that the user of the another electronic apparatus set for the first application 10. Accordingly, convenience and satisfaction of the user 1 can be improved.

In FIG. 1, an example wherein a request for access for the electronic apparatus 100 of an application is received while the application is executed was described, but this is merely an example, and a request for access may be received while the user 1 is initially installing an application in the electronic apparatus 100.

Figure 2:
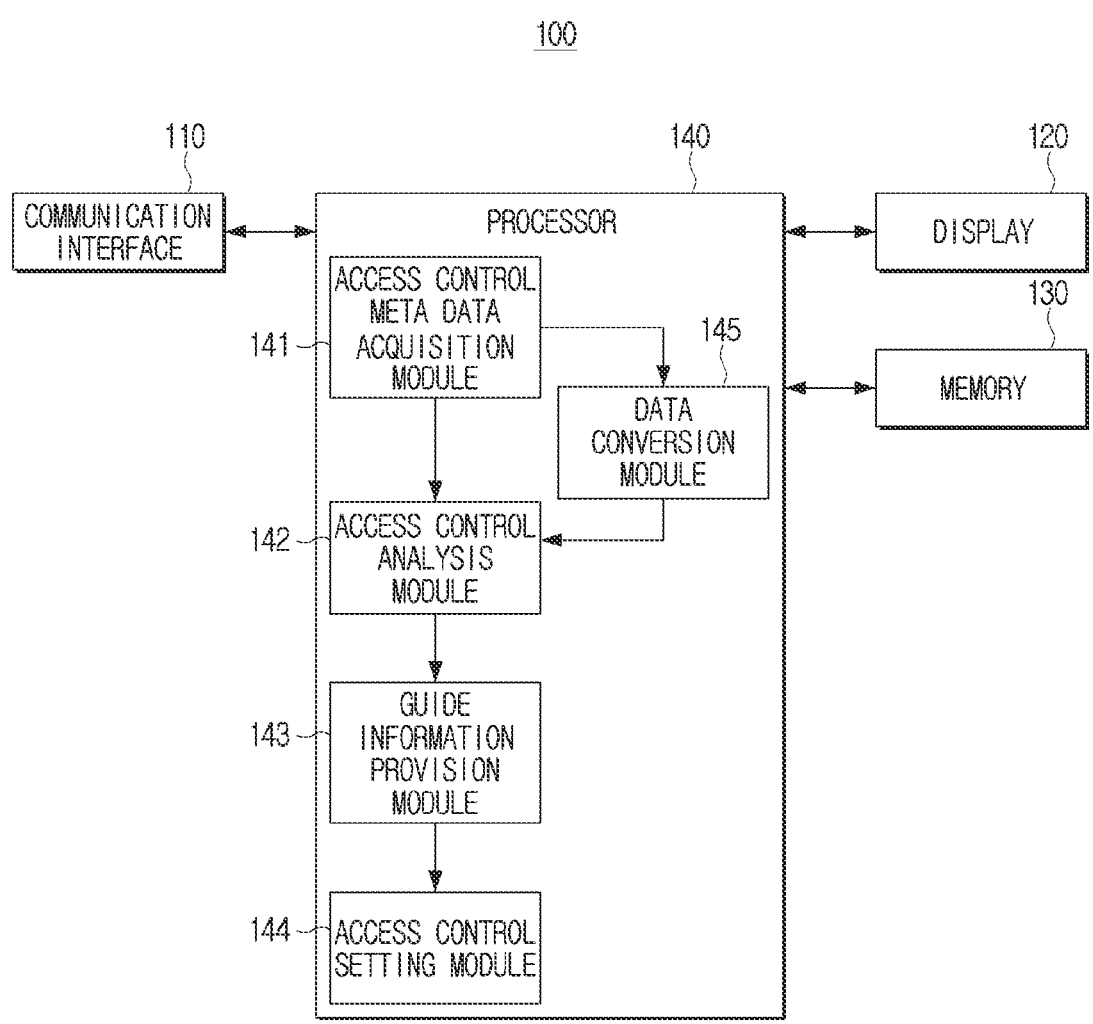
FIG. 2 is a block diagram illustrating an example configuration of an electronic apparatus according to various embodiments.

FIG. 2 is a block diagram illustrating an example configuration of an electronic apparatus according to various embodiments. The electronic apparatus 100 may include a communication interface (e.g., including communication circuitry) 110, a display 120, a memory 130, and a processor (e.g., including processing circuitry) 140. As an example, the electronic apparatus 100 may be a smartphone, but it may also be implemented as various apparatuses such as a tablet PC, a wearable device, etc.

The communication interface 110 includes at least one circuit, and it may perform communication with various types of external apparatuses according to various types of communication methods. For example, the communication interface 110 may receive a request for access for information stored in the memory 130 from an external server.

The display 120 may display an execution screen of an application executed by the processor 140. The display 120 may display a message regarding a request for access received from an external server.

The memory 130 may store an operating system (OS) for controlling the overall operations of the components of the electronic apparatus 100 and instructions or data related to the components of the electronic apparatus 100. For example, the memory 130 may include information on the operating system of the electronic apparatus 100, and identification information for another user related to the user of the electronic apparatus 100 (e.g., the contact list of another user or the relation of the another user with the user of the electronic apparatus 100). The memory 130 may be implemented as a non-volatile memory (ex: a hard disc, a solid state drive (SSD), a flash memory), a volatile memory, etc.

The processor 140 may include various processing circuitry and control the overall operations of the electronic apparatus 100.

For example, the processor 140 may acquire a user command for executing an application stored in the memory 130. Here, the processor 140 may control the display 120 to display an application execution screen while executing the application.

While an application is executed, the processor 140 may receive a request for access for information stored in the memory 130 from an external server corresponding to the application through the communication interface 110. For example, the processor 140 may receive a request for access for an image stored in the memory 130 from an external server corresponding to a photo editing application. Also, the processor 140 may receive a request for access for a platform resource of the electronic apparatus 100. The platform resource may refer, for example, to information acquired through the electronic apparatus 100 or an interface for acquiring information. For example, the platform resource may refer, for example, to specific information such as GPS information or contact address information. The platform resource may refer, for example, to an interface such as a camera for acquiring an image or a microphone for acquiring audio.

When a request for access for the information stored in the memory 130 or the platform resource is received as described above, the processor 140 may control the display 120 to display a message corresponding to the request for access (e.g., "Would you allow A to access the gallery of the electronic apparatus?"). Here, the user needs to determine whether to approve the request for access. Under such a situation, the processor 140 may provide guide information so that the user can determine whether to approve the request for access more easily. For example, the processor 140 may display a message recommending approval for the request for access.

Hereinafter, an operation of the processor 140 for guiding a response for a request for access will be described in greater detail. The processor 140 may include an access control meta data acquisition module (e.g., including processing circuitry and/or executable program elements) 141, an access control analysis module (e.g., including processing circuitry and/or executable program elements) 142, a guide information provision module (e.g., including processing circuitry and/or executable program elements) 143, an access control setting module (e.g., including processing circuitry and/or executable program elements) 144, and a data conversion module (e.g., including processing circuitry and/or executable program elements) 145.

The access control meta data acquisition module 141 may include various processing circuitry and/or executable program elements and acquire access control meta data. The access control meta data may include information related to access control, and it may include information used for the electronic apparatus 100 to provide guide information. The access control meta data may be referred to as meta data, for the convenience of explanation.

As an example, the meta data may include access control information for an application of another electronic apparatus related to the electronic apparatus 100. For example, the access control information may include whether to approve access for the application and an access approval range. Another electronic apparatus related to the electronic apparatus 100 may refer, for example, to an apparatus related to the user of the electronic apparatus 100, and hereinafter, will be referred to as another electronic apparatus for convenience of explanation. For example, another electronic apparatus may include another apparatus of the user (e.g., in case the electronic apparatus 100 is a smartphone, and another electronic apparatus is a tablet PC of the user). Another electronic apparatus may include apparatuses of other users stored in the address book of the electronic apparatus 100. Another electronic apparatus may include an apparatus registered in an external server wherein the electronic apparatus 100 is registered (e.g., an external server storing and managing access control meta data). In the disclosure, a server corresponding to an application stored in the memory 130 may be referred to as a first external server, and a server providing and managing meta data may be referred to as a second external server.

As another example, the meta data may include information on relevance (or intimacy) between the user of the electronic apparatus 100 and the user of another electronic apparatus. The information on the relevance may include a specific value (or a weight) corresponding to the relevance. For example, in case the user of the another electronic apparatus being a family member of the user of the electronic apparatus 100, the weight corresponding to the relevance may be 10. In case the user of the another electronic apparatus is a fellow worker of the user of the electronic apparatus 100, the weight corresponding to the relevance may be 2. However, this is merely an example, and relevance and a weight corresponding thereto may be set in various ways by the user of the electronic apparatus 100.

As still another example, the meta data may include information on an application installed in the memory 130. The information on the application may include the purpose of a server corresponding to the application of accessing the electronic apparatus 100, and terms and conditions regarding the use, keeping, processing, etc. of information to be collected from the electronic apparatus 100.

The access control meta data acquisition module 141 may acquire meta data from the second external server through the communication interface 110. For example, in the second external server, access control information of another electronic apparatus related to the electronic apparatus 100 for various types of applications may be stored. Accordingly, if a request for access is received from the first external server while an application is executed, the access control meta data acquisition module 141 may acquire meta data from the second external server. However, this is merely an embodiment, and the access control meta data acquisition module 141 may acquire meta data from another electronic apparatus through the communication interface 110.

When meta data is acquired, the access control analysis module 142 may acquire an access approval score based on the meta data. An access approval score may refer, for example, to a score used for determining whether to recommend approval for a request for access to a user. For example, if an access approval score is greater than a specified value, the electronic apparatus 100 may recommend approval of access to the user. On the other hand, if an access approval score is less than the specified value, the electronic apparatus 100 may not recommend approval of access to the user.

The access control analysis module 142 may include various processing circuitry and/or executable program elements and acquire a score for approval of access control based on whether another electronic apparatus approved access to an application and relevance between the user of the electronic apparatus 100 and the user of the another electronic apparatus. For example, in case another electronic apparatus allowed access to an application, the access control analysis module 142 may acquire a parameter value (or a coefficient) for the another electronic apparatus as 1. On the other hand, in case another electronic apparatus did not allow access to an application, the access control analysis module 142 may acquire a parameter value for the another electronic apparatus as 0.

The access control analysis module 142 may identify a weight corresponding to the relevance between the user of the electronic apparatus 100 and the user of the another electronic apparatus. When a weight is identified, the access control analysis module 142 may calculate an access approval score using the identified weight and the parameter value for the another electronic apparatus. For example, the access control analysis module 142 may calculate an access approval score by multiplying the identified weight and the parameter value. For example, in case the another electronic apparatus allowed access to an application and the identified weight is 10, the access control analysis module 142 may acquire an access approval score of which value is 10. On the other hand, in case the another electronic apparatus did not approve access to an application, the access control analysis module 142 may acquire an access approval score having a value of 0.

When an access approval score is acquired as described above, the guide information provision module 143 may acquire guide information based on the access approval score. For example, if an access approval score is greater than the specified value, the guide information provision module 143 may acquire guide information recommending access approval. The guide information recommending access approval may include a guide message (e.g., "I recommend access approval"). On the other hand, if an access approval score is less than the specified value, the guide information provision module 143 may acquire guide information not recommending access approval.

The guide information provision module 143 may include various processing circuitry and/or executable program elements and determine a degree of recommendation of access approval according to an access approval score. For example, if an access approval score is 8-10, the guide information provision module 143 may acquire a message 'strongly recommending access approval.' If an access approval score is 5-7, the guide information acquisition module 143 may acquire a message 'strongly recommending access approval.' The guide information provision module 143 may acquire a UI element corresponding to an access approval score.

The guide information provision module 143 may provide the acquired guide information. For example, the guide information provision module 143 may control the display 120 to display a guide message. The guide information provision module 143 may control the display 120 to display a UI element indicating the degree of recommendation for access approval.

Accordingly, the user may select whether to approve a request for access with reference to the guide information. If a user command selecting whether to approve a request for access is acquired, the access control setting module 144 may set whether access by an application to the electronic apparatus 100 is possible. For example, if a user command approving a request for access is acquired, the access control setting module 144 may store information on an application in the memory 130, and allow access by the application to the electronic apparatus 100. On the other hand, if a user command not approving a request for access is acquired, the access control setting module 144 may set access control such that access by an application to the electronic apparatus 100 is not allowed.

A structure of meta data acquired through the access control meta data acquisition module 141 may be different from the structure of data used in the electronic apparatus 100. For example, there may be a case wherein the OS of another electronic apparatus is IOS, and the OS of the electronic apparatus 100 is Android. In such a case, the data conversion module 145 may perform an operation of converting the acquired meta data to correspond to the data structure of the electronic apparatus 100. For example, the data conversion module 145 may perform an operation of converting the architecture or the schema of meta data. When meta data is acquired through the data conversion module 145, the access control analysis module 142 may acquire an access approval score based on the acquired meta data.

In the above example, each module 141 to 145 was described as a component of the processor 140, but this is merely an example, and each module 141 to 145 may be stored in the memory 130. The processor 140 may load the plurality of modules 141 to 145 stored in the memory 130 from a non-volatile memory to a volatile memory and execute each function of the plurality of modules 141 to 145. Each module of the processor 140 may be implemented as software, or implemented as a form wherein software and hardware are combined.

Figure 3A:
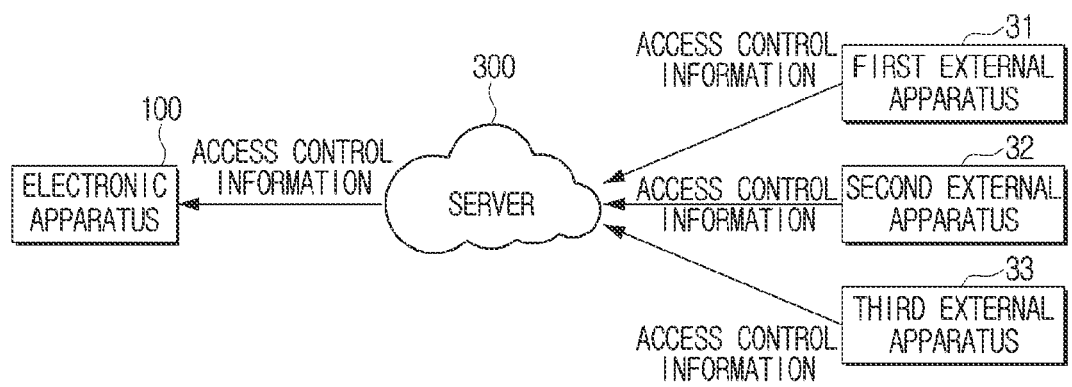
FIG. 3A is a diagram illustrating an example method for acquiring access control information according to various embodiments.

FIG. 3A is a diagram illustrating an example method for acquiring access control information according to various embodiments. As described above, while an application stored in the electronic apparatus 100 is executed, the electronic apparatus 100 may receive a request for access for information or resources stored in the electronic apparatus 100 from the first external server corresponding to the application. The electronic apparatus 100 may receive access control information from the second external server. For example, external apparatuses 31, 32, 33 related to the electronic apparatus 100 may transmit access control information to the second external server 300. Here, the access control information may include information on whether the external apparatuses 31, 32, 33 allowed access in response to the first external server's request for access to the external apparatuses 31, 32, 33 and information on the approval range.

The second external server 300 may store the access control information received from the external apparatuses 31, 32, 33. The electronic apparatus 100 may acquire the access control information of the external apparatuses 31, 32, 33 stored in the second external server 300 from the second external server 300. Where the operating systems of the external apparatuses 31, 32, 33 are different from the operating system of the electronic apparatus 100, the second external server 300 may convert the structure of the access control information of the external apparatuses 31, 32, 33 such that the electronic apparatus 100 can use the information as it is. The second external server 300 may store the access control information of which structure was converted to correspond to the electronic apparatus 100. For example, in case the operating systems of the external apparatuses 31, 32, 33 are IOS, and the OS of the electronic apparatus 100 is Android, the second external server 300 may convert the structure of the access control information of the external apparatuses 31, 32, 33 to an Android type.

The external apparatuses 31, 32, 33 may periodically update the access control information to the second external server 300. Accordingly, the access control information prestored in the second external server 300 may be changed. When the access control information stored in the second external server 300 is changed as described above, the electronic apparatus 100 may provide a message notifying that the access control information was changed. For example, the user of the first external apparatus 31 may approve the first application's request for access for information stored in the first external apparatus 31, and then change the authority for access such that the information stored in the first external apparatus 31 cannot be accessed afterwards. The changed access control information of the first external apparatus 31 may be transmitted to the second external server 300, and the electronic apparatus 100 may receive the changed access control information from the second external server 300. The electronic apparatus 100 may display a message notifying that the access control information of the first external server 31 was changed (e.g., "Gil-dong Hong changed the authority for access to A").

Figure 3B:
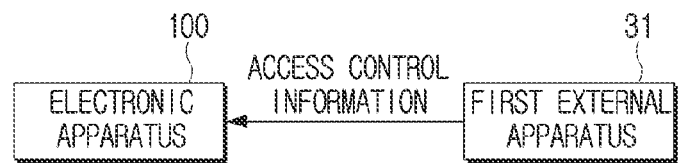

FIG. 3B is a diagram illustrating an example method for acquiring access control information according to various embodiments. The electronic apparatus 100 may acquire access control information from the first external apparatus 31. For example, the first external apparatus 31 may transmit access control information to the electronic apparatus 100 in the form of an SMS message. Where the operating system of the first external apparatus 31 is different from the operating system of the electronic apparatus 100, the electronic apparatus 100 may convert the structure of the access control information of the first external apparatus 31. For example, the electronic apparatus 100 may perform an operation of converting the architecture or the schema of the access control information of the first external apparatus 31.

FIG. 4 is a diagram illustrating an example method for calculating an access approval score according to various embodiments. In the electronic apparatus 100, information on users of other electronic apparatuses (or external apparatuses) related to the user 1 may be stored. For example, the electronic apparatus 100 may store an address book in the form of a lookup table 41 wherein the names of users of other electronic apparatuses and weights are matched. The weights may be set by the user 1, or they may be set for respective groups or set for respective members in a group. The access control information 42 may refer, for example, to information regarding whether each user or each external apparatus approved access for a specific application.

The electronic apparatus 100 may calculate access approval scores 43 based on the weights for users of other electronic apparatuses and the access control information 42 acquired from an external server or an external apparatus. As described above, the access approval scores 43 may refer, for example, to scores used for determining whether to recommend approval for a request for access to the user 1. The electronic apparatus 100 may calculate the access approval scores 43 for respective users by multiplying the weights for users of other electronic apparatus and coefficients for the access control information 42, and calculate the total sum by summing up the scores or calculate an average score. Referring to FIG. 4 as an example, the total sum of the access approval scores for the first application may be 20, and the average may be 5.

When the access approval scores 43 are calculated by a method as above, the electronic apparatus 100 may acquire guide information based on the access approval scores 43. For example, if the average value of the access approval scores 43 is greater than a specified value (e.g., 4), the electronic apparatus 100 may acquire guide information recommending access approval for the first application. On the other hand, if the average value of the access approval scores 43 is less than the specified value, the electronic apparatus 100 may acquire guide information not recommending access approval for the first application. Likewise, the electronic apparatus 100 may determine whether to recommend access approval by comparing the total sum but not the average value of the access approval scores 43 and the predetermined value. The electronic apparatus 100 may determine the degree of recommendation for access approval according to the access approval scores 43. For example, as the access approval scores 43 are higher, the degree of recommendation may be greater.

The electronic apparatus 100 may acquire guide information for a request for access of an application based on the characteristic of the application included in meta data. For example, the characteristic of the application may include the property or the purpose of the service of the application.

FIG. 5 is a diagram illustrating an example method for providing guide information according to various embodiments. When a request for access is received from an application B (or an external server corresponding to the application B), the electronic apparatus 100 may display a message 51 corresponding to the request for access. The electronic apparatus 100 may determine relevance between the characteristic of the application B and information or resources stored in the electronic apparatus 100 which becomes a subject of the request for access. For example, the electronic apparatus 100 may determine relevance between the service purpose of the application B and the information stored in the electronic apparatus 100. For example, if the application B which is a navigation application makes a request for access for the gallery of the electronic apparatus 100, the electronic apparatus 100 may determine that relevance between the service purpose of the application B and the gallery is low, and provide guide information 52 recommending refusal for the request for access. On the other hand, in case the application B is a photo editing application, the electronic apparatus 100 may determine that the relevance between the service purpose of the application B and the gallery is high, and display guide information 52 recommending refusal for the request for access.

The electronic apparatus 100 may display the message 51 regarding the request for access and the guide information 52 simultaneously or display them sequentially with a predetermined time difference. The guide information 52 may include a message which is a basis for recommendation. Accordingly, the user 1 may conveniently determine whether to allow access of the application B with reference to the guide information 52.

FIG. 6 is a diagram illustrating an example method for providing guide information according to various embodiments. For example, the electronic apparatus 100 may receive a request for access for the location of the electronic apparatus 100 from an application C. The electronic apparatus 100 may determine whether to recommend approval for the request for access of the application C. For example, the electronic apparatus 100 may determine whether to recommend approval for the request for access by calculating an access approval score as described above with reference to FIG. 4, or determining relevance between the application and the subject of the request for access. When determination about recommendation is made as described above, the electronic apparatus 100 may provide a UI element 62 indicating the result of recommendation. For example, as illustrated in FIG. 6, the electronic apparatus 100 may display a UI element 62 in the form of a bar indicating the degree of recommendation. For example, the UI element 62 may correspond to an access approval score.

In the above, a method for the electronic apparatus 100 to provide guide information regarding access control is described. The electronic apparatus 100 may provide guide information regarding management of information stored in the electronic apparatus 100.

FIG. 7 is a diagram illustrating an example method for providing guide information according to various embodiments. The electronic apparatus 100 may acquire a file 72 and file management information 73 corresponding to the file 72 from an external apparatus 71 and store them. Here, the file management information 73 may refer, for example, to information regarding how the file 72 is managed at the external apparatus 71. For example, the file 72 may include an image including personal information of the user of the external apparatus 71, and it may be stored and protected in a secure folder in the external apparatus 71.

The electronic apparatus 100 may provide guide information 74 regarding management of the file 72 to the user based on the file management information 73. For example, the guide information 74 may include a message regarding a method by which the user of the external apparatus 71 manages the file 72 ("Gil-dong Hong is protecting this file with a secure folder"). Accordingly, the user 1 may store the file 72 in a separate secure folder, and thereby manage the file 72 such that it cannot be accessed from the outside.

FIG. 8 is a block diagram illustrating an example configuration of an electronic apparatus according to various embodiments. The electronic apparatus 100 may include a communication interface (e.g., including communication circuitry) 110, a display 120, a memory 130, and a processor (e.g., including processing circuitry) 140. Hereinafter, each component of the electronic apparatus 100 will be described, and contents overlapping with the description in FIG. 2 may not be repeated here.

The communication interface 110 may include various communication circuitry and receive access control meta data from an external apparatus or an external server. The communication interface 110 may perform data communication wirelessly or via wire. In the case of performing communication with an external apparatus by a wireless communication method, the communication interface 110 may include at least one of a Wi-Fi communication module, a cellular communication module, a 3rd Generation (3G) mobile communication module, a 4th Generation (4G) mobile communication module, a 4th Generation Long Term Evolution (LTE) communication module, or a 5th Generation (5G) mobile communication module. The communication interface 110 according to various embodiments may be implemented as a wireless communication module, but this is merely an example, and it may also be implemented as a wired communication module (e.g., a LAN, etc.).

The display 120 may display various screens. In particular, the display 120 may display guide information for guiding a user's response for a request for access. The display 120 may be implemented as a touch screen.

The memory 130 may store an operating system (OS) for controlling the overall operations of the components of the electronic apparatus 100 and instructions or data related to the components of the electronic apparatus 100. For this, the memory 130 may be implemented as a non-volatile memory (ex: a hard disc, a solid state drive (SSD), a flash memory), a volatile memory, etc. The memory 130 may be divided into a general memory and a secure memory. For example, a file including personal information of a user may be stored in the secure memory according to the setting of the user. As an application cannot access the secure memory, the personal information of the user can be protected safely.

The processor 140 may include various processing circuitry and control the overall operations of the electronic apparatus 100. For example, if a user command for executing an application stored in the memory 130 is acquired, the processor 140 may execute the application.

While an application is executed, the processor 140 may acquire a request for access for information or resources stored in the memory 130 through the communication interface 110. For example, the processor 140 may acquire access control information for an application of another electronic apparatus related to the electronic apparatus. The access control information may include whether the another electronic apparatus allowed access for an application and an access approval range. Also, the processor 140 may acquire information on relevance between the user of the electronic apparatus 100 and the user of the another electronic apparatus. The information on the relevance may include a specific value (or a weight) corresponding to the relevance, and the weight may be set by the user.

The processor 140 may acquire guide information for guiding the user's response to the request for access based on the access control information of the another electronic apparatus and the relevance between the electronic apparatus 100 and the another electronic apparatus. The processor 140 may identify a coefficient corresponding to the access control information and a weight corresponding to the relevance. For example, the memory 130 may store a lookup table wherein a coefficient and a weight are matched to each other, and the processor 140 may identify the coefficient and the weight based on the lookup table.

The processor 140 may calculate an access approval score by, for example, multiplying the coefficient and the weight, and acquire guide information based on the calculated access approval score. For example, if the access approval score is greater than a predetermined value, the processor 140 may acquire guide information recommending approval for the request for access. In contrast, if the access approval score is smaller than the predetermined value, the processor 140 may acquire guide information recommending refusal for the request for access.

The processor 140 may control the display to display a UI element corresponding to the access approval score. For example, the UI element may be a GUI in the form of a bar corresponding to the access approval score.

FIG. 9 is a flowchart illustrating an example method for controlling an electronic apparatus according to various embodiments. When a user command for executing an application stored in the electronic apparatus 100 is acquired, the electronic apparatus 100 may execute the application in operation S910.

If a request for access for information stored in the electronic apparatus 100 is acquired from an external server while executing the application, the electronic apparatus 100 may acquire access control information for an application of another electronic apparatus and relevance between the user of the electronic apparatus 100 and the user of the another electronic apparatus in operation S920.

The electronic apparatus 100 may acquire guide information for guiding the user's response to the request for access based on the acquired access control information and relevance in operation S930. The electronic apparatus 100 may display a message including the guide information in operation S940.

FIG. 10 is a signal flow diagram illustrating an example access control recommendation system according to various embodiments. The access control recommendation system may include an electronic apparatus 100, a first external server 200, and a second external server 300.

When a user command for executing an application is acquired, the electronic apparatus 100 may execute the application in operation S1010. While the electronic apparatus 100 executes the application, the first external server 200 corresponding to the application may transmit a request for access for information stored in the electronic apparatus 100 in operation S1020.

When the request for access is received, the electronic apparatus 100 may request access control meta data corresponding to the request for access to the second external server 300. The second external server 300 may acquire access control meta data corresponding to the request for access in operation S1040. In the second external server 300, access control meta data regarding various types of applications of other electronic apparatuses related to the electronic apparatus 100 may be stored. The second external server 300 may acquire the access control meta data of the other electronic apparatuses related to the first external server 300 among the stored access control meta data, and transmit the data to the electronic apparatus 100 in operation S1050.

When the access control meta data is acquired, the electronic apparatus 100 may acquire guide information for guiding the user's response to the request for access based on the access control meta data in operation S1060, and provide the guide information in operation S1070.

The various embodiments described above may be implemented in a recording medium that can be read by a computer or an apparatus similar to a computer, using software, hardware, or a combination thereof. In some cases, the embodiments described in this disclosure may be implemented as a processor itself. According to implementation by software, the embodiments such as processes and functions described in this specification may be implemented as separate software modules. Each of the software modules can perform one or more functions and operations described in this specification.

Computer instructions for performing processing operations according to the aforementioned various embodiments of the disclosure may be stored in a non-transitory computer-readable medium. Computer instructions stored in such a non-transitory computer-readable medium may make the processing operations according to the aforementioned various embodiments performed by a specific machine, when the instructions are executed by the processor of the specific machine.

A non-transitory computer-readable medium refers to a medium that stores data semi-permanently, and is readable by machines. As non-limiting examples of a non-transitory computer-readable medium, there may be a CD, a DVD, a hard disc, a blue-ray disc, a USB, a memory card, a ROM, and the like.

A storage medium that is readable by machines may be provided in the form of a non-transitory storage medium. The 'non-transitory' storage medium is a tangible device, and may not include a signal (e.g.: an electronic wave), and the term does not distinguish a case wherein data is stored semi-permanently in a storage medium and a case wherein data is stored temporarily. For example, 'a non-transitory storage medium' may include a buffer wherein data is temporarily stored.

Also, according to an embodiment of the disclosure, the method according to the various embodiments described in the disclosure may be provided while being included in a computer program product. A computer program product may refer to a product, and it can be traded between a seller and a buyer. A computer program product may be distributed in the form of a storage medium that is readable by machines (e.g.: a compact disc read only memory (CD-ROM)), or it may be distributed directly between two user devices (e.g.: smartphones), and distributed on-line (e.g., download or upload) through an application store (e.g., Play Store™). In the case of on-line distribution, at least a portion of a computer program product (e.g., a downloadable app) may be stored in a storage medium such as the server of the manufacturer, the server of the application store, and the memory of the relay server at least temporarily, or may be generated temporarily.

While the disclosure has been illustrated and described with reference to various example embodiments, it will be understood that the various example embodiments are intended to be illustrative, not limiting. It will be further understood by those skilled in the art that various modifications may be made, without departing from the true spirit and full scope of the disclosure including the appended claims and their equivalents.

What is claimed is:

1. An electronic apparatus comprising:
a display;
a communication interface comprising communication circuitry;
a memory; and a processor, wherein the processor is configured to:
based on acquiring a command for executing an application stored in the memory, execute the application, based on acquiring a request for access for information stored in the memory through the communication interface while executing the application, acquire access control information of another electronic apparatus related to the electronic apparatus for the application and a relevance between a user of the electronic apparatus and a user of the another electronic apparatus, wherein the access control information comprises: at least one of whether the another electronic apparatus approved the request for access of the application or an approval range, identify a coefficient corresponding to the access control information and a weight corresponding to the relevance, multiply the coefficient and the weight and calculate an access approval score, acquire guide information for guiding a response to the request for access based on the access control information, the access approval score and the relevance, and control the display to display a message including the guide information.

2. The electronic apparatus of claim 1,
wherein the processor is configured to:
based on the access approval score being greater than a specified value, acquire guide information recommending approval for the request for access, and
based on the access approval score being less than the specified value, acquire guide information recommending refusal for the request for access.

3. The electronic apparatus of claim 1,
wherein the processor is configured to:
control the display to display a UI element corresponding to the access approval score.

4. The electronic apparatus of claim 1, wherein the processor is configured to: acquire the guide information based on relevance between information on the application and the information stored in the memory, and the information on the application comprises: at least one of information on a purpose of the service of the application or information on a use for using the information stored in the memory.

5. The electronic apparatus of claim 1,
wherein the weight is set, and the memory stores a lookup table wherein the coefficient and the weight are matched to each other.

6. The electronic apparatus of claim 1, wherein the information stored in the memory and the access control information are acquired from the another electronic apparatus through the communication interface.

7. A method for controlling an electronic apparatus, the method comprising:
based on acquiring a command for executing an application stored in the electronic apparatus, executing the application; based on acquiring a request for access for information stored in the electronic apparatus from an external server while executing the application, acquiring access control information of another electronic apparatus related to the electronic apparatus for the application and a relevance between a user of the electronic apparatus and a user of the another electronic apparatus; wherein the access control information comprises: at least one of whether the another electronic apparatus approved the request for access of the application or an approval range, identifying a coefficient corresponding to the access control information and a weight corresponding to the relevance, multiplying the coefficient and the weight and calculate an access approval score, acquiring guide information for guiding a response to the request for access based on the access control information, the access approval score and the relevance; and displaying a message including the guide information.

8. The method of claim 7,
wherein the acquiring guide information comprises:
based on the access approval score being greater than a specified value, acquiring guide information recommending approval for the request for access; and based on the access approval score being less than the specified value, acquiring guide information recommending refusal for the request for access.

9. The method of claim 7, further comprising:
displaying a UI element corresponding to the access approval score.

10. The method of claim 7, wherein the acquiring guide information comprises:
acquiring the guide information based on relevance between information on the application and the information stored in the memory, and
the information on the application comprises: at least one of information on a purpose of the service of the application or information on a use for using the information stored in the memory.

11. The method of claim 7,
wherein the weight is set, and the coefficient and the weight are matched to each other and stored as a lookup table.

12. The method of claim 7, wherein the stored information and the access control information are acquired from the another electronic apparatus.

13. A non-transitory computer-readable recording medium having stored thereon a program which, when executed by a processor of a computer performs the method of claim 7.

* * * * *